June 16, 1936.    P. N. PETERS    2,044,183
AUTOMOBILE SAFETY DEVICE
Filed Dec. 14, 1935    2 Sheets-Sheet 1
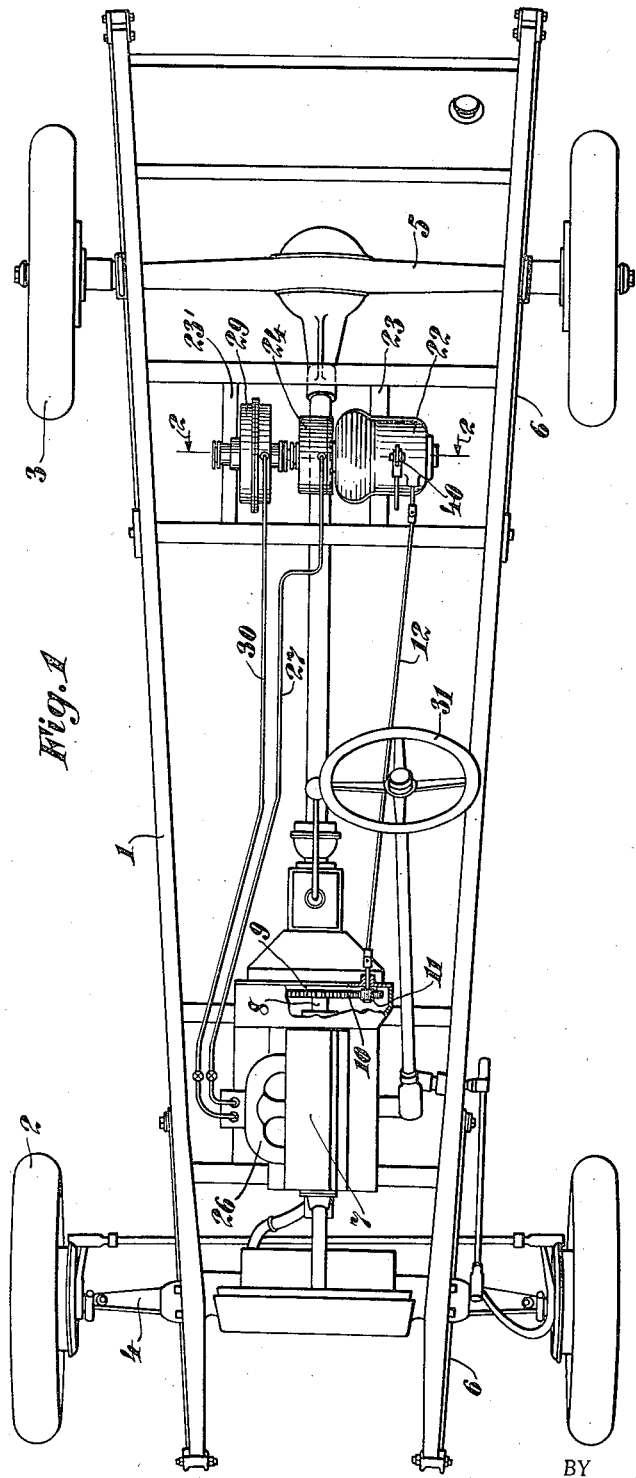
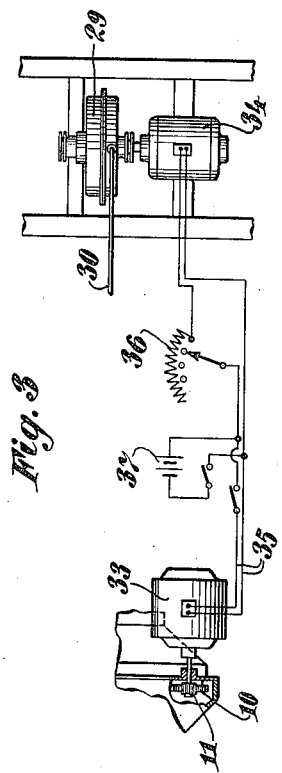
INVENTOR.
Peter Nicolas Peters,
BY
HIS ATTORNEY.

June 16, 1936. P. N. PETERS 2,044,183
AUTOMOBILE SAFETY DEVICE
Filed Dec. 14, 1935 2 Sheets-Sheet 2
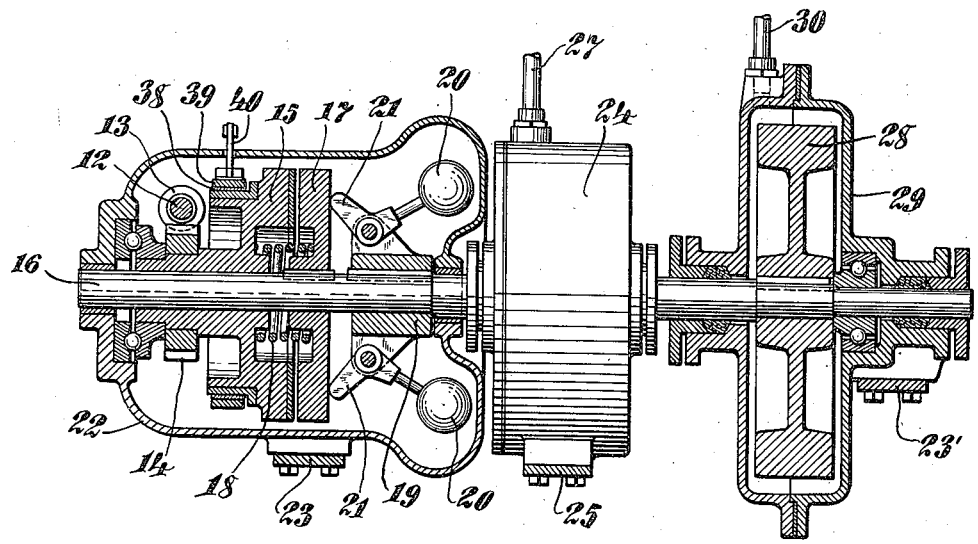
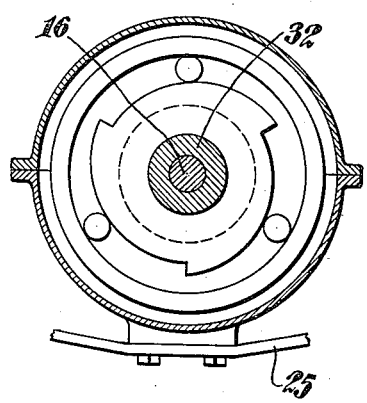
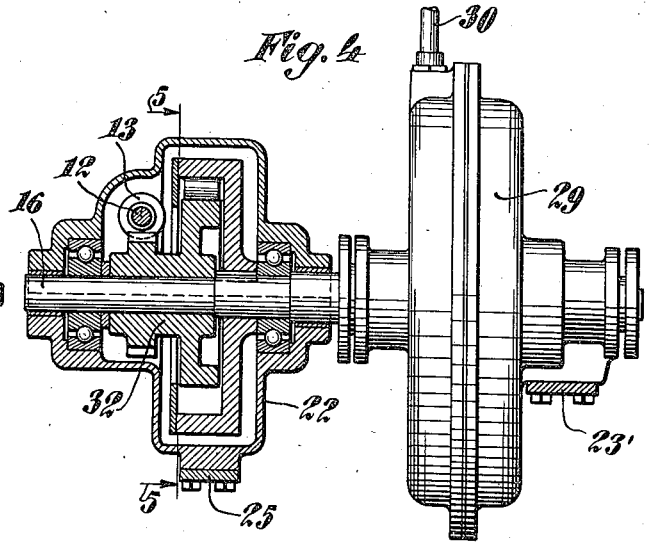
INVENTOR.
*Peter Nicolas Peters*,
BY
*HIS* ATTORNEY.

Patented June 16, 1936

2,044,183

UNITED STATES PATENT OFFICE 2,044,183

AUTOMOBILE SAFETY DEVICE

Peter Nicolas Peters, Brooklyn, N. Y.

Application December 14, 1935, Serial No. 54,421

12 Claims. (Cl. 180—1)

The present invention relates to safety devices for automobiles and, more particularly, to safety devices depending for their effect on gyroscopic action.

Among the most frequent accidents in modern automobile travel are skidding and overturning as a result of too great a speed when making a turn in the road. It is the main object of the present invention to prevent such accidents, whether they are due directly to excessive speed and an uncompensated centrifugal force, or to uneven braking, or to the effect of road camber on the steering, or to "soft shoulders" along the path of travel, or to the numerous other causes tending to upset the equilibrium of a car traveling at a high speed. Another object is to facilitate driving under the above indicated conditions. Still another object is to add not only to the safety, but also to the comfort of the passengers. It is a further object of the invention to attain this safety and comfort in a simple manner, without adding any substantial weight to the car and without unduly complicating its operation. Other objects will become apparent from the description of the invention set forth below.

It is well known that on standard railroads the track is inclined along all curves, the rails being raised on the "outer" side of the track, i. e. on the side farthest away from the center of the curve, the object being to counteract the effect of centrifugal forces. This inclination is, of course, communicated to the cars of the train. In monorail systems, whether ground or suspension, the cars, under the action of centrifugal forces when going along a curve, swing away from their vertical position, automatically adjusting themselves to the prerequisites of balance. This is one of the most interesting features of the monorail systems in which the cars are held upright by gyroscopic action. As a car in such a system follows the turn in the track, it gradually tilts to exactly the right angle. The same is true in suspension monorails. Always, the car is allowed to assume the tilted position required for the safety of travel.

Now, in automobile travel, the road being trackless, the problem differs from that of both, the standard and the monorail railroads. The road bed is sometimes inclined along its curved portions in a manner similar to the bed of a railroad track, but, except, possibly, on race tracks, never sufficiently so as to compensate for the centrifugal effect of high speed travel, and, more often than not, is not inclined at all. Besides, in automobile travel, turns are often made on perfectly straight stretches of road, as when passing other vehicles. Nor can an automobile making a turn swing away from its vertical position into one wherein the centrifugal torque is balanced, like a car in a monorail system. It is, therefore, necessary to provide other means to secure the same degree of safety as that provided by the tilted track of standard railroads or the ability of monorail cars to swing into a balanced position. My invention provides such means which, in substance, comprises a mass rapidly rotating about an axis parallel to the axle of the traction wheels, in a sense opposite to that of the rotation of the wheels. When an automobile, traveling at high speed, makes a turn, the tendency is for the wheels on the "inner" side, i. e., on the side nearest the center of the curve, to leave the ground. The aforesaid rapidly rotating mass opposes this tendency. Such opposition takes place in cooperation with the action of the vehicle springs which permit a certain degree of inclination of the body of the car relatively to the ground. By making the effect of the rotating mass sufficiently great, the springs on the "inner" side of the car will be more compressed than those on the "outer" side, so that the body of the car will assume a proper inclination relatively to the wheels, thus not only providing an element of safety, but, at the same time, adding to the comfort of the passengers.

Centrifugal force is not the only factor disturbing the equilibrium of an automobile traveling at high speed. There is, also, to be considered the gyroscopic action of the wheels themselves. This action is in the same direction as the action of the centrifugal torque, and insofar as it affects the car when traveling along a curve is taken care of by the opposing gyroscopic action of the rapidly rotating mass. But the gyroscopic effect of the wheels enters as a factor also in other circumstances. Many automobile accidents are traceable to loss of control by the driver when passing another car on a cambered road, or when dropping the curb-side wheels off the road into a "soft shoulder". Either condition implies angular displacement about the longitudinal axis of the car, the effect of which on the rapidly revolving wheels is to swerve the car, sometimes so violently as to wrest the steering wheel away from the driver and send the car into a ditch. This danger is practically eliminated when the car is provided with the safety device forming the subject matter of the present invention, since the gyroscopic effect of the mass rotating in a direction opposite to that of the car wheels counteracts the gyroscopic action of these wheels.

The present invention is also provided with means for controlling the angular velocity of the rotating mass to correspond to the speed of the vehicle, since a greater driving speed requires a more powerful gyroscopic balancing torque. The ideal correspondence is one in which the angular velocity of the rotating mass is proportional to the speed of the car. However, for all practical purposes, it is sufficient to regulate the angular velocity of the rotating mass in such a manner that it will be maintained at a predetermined maximum when the car travels at full speed, and will be properly reduced whenever the speed of the car decreases. Both forms of control are described below.

In the drawings, Figure 1 is a top view of the chassis of an automobile equipped with a device embodying the present invention. Figure 2 is an enlarged cross section taken along the line 2—2 of Figure 1. Figure 3 is a modification of the invention. Figure 4 is a further modification shown partly in cross section. Figure 5 is a cross section taken along the line 5—5 of Figure 4.

Referring to the figures in detail, and specifically to Figures 1 and 2, without describing the automobile in full, since only some of its elements are involved in the present invention, 1 is the chassis frame of an automobile having a pair of front wheels 2 and a pair of rear wheels 3, with their respective axles 4 and 5; springs 6 between the chassis frame 1 and the axles 4 and 5; engine 7 with the driving shaft 8 and fly-wheel 9; ring gear 10 forming a part of the fly-wheel 9; and steering wheel 31. All of these elements are standard and well known. By chassis frame is meant the sprung part of the chassis, as distinguished from the unsprung part (axles and road wheels).

The mechanism embodying the present invention comprises a pinion 11 meshing with the ring gear 10 and driving the shaft 12 when the engine shaft 8 rotates, the shaft 12, in its turn, driving the worm gear 13 which meshes with the gear 14 on the body 15, the latter being mounted on the shaft 16 and free to rotate thereon. The shaft 16 is parallel to the axle 5. A clutch member 17, spaced from the body 15 by a spring 18, is keyed to the shaft 16, but is free to slide longitudinally thereon. On the shaft 16 is also mounted a governor consisting of weights 20 on bell crank levers 21 pivoted on the body 19 which is keyed to the shaft 16 for rotation therewith. One arm of each bell crank lever 21 abuts the face of the clutch member 17. A housing 22 is provided for the clutch mechanism. The housing 22 is supported on cross member 23 attached to the chassis 1. The shaft 16 is driven by a vacuum motor 24 connected to the engine manifold 26 by pipe 27 and supported on cross member 25 attached to the chassis 1. Enclosed in an air tight housing 29, a body or mass 28 rotates with the shaft 16 to which it is keyed. Additional support for the entire device is afforded at 23'. Vacuum is created in the housing 29 by connecting it with the manifold 26, a separate pipe 30 being provided for the purpose. As was mentioned above, the angular velocity of the rotating mass 28 is maintained at a predetermined maximum when the car travels at full speed. Should the angular velocity of the rotating mass 28 exceed this predetermined maximum, the crank levers 21 will press against the clutch member 17, causing it to engage the body 15 (which is revolving at a lower angular velocity), thereby braking the angular velocity of the shaft 16 to which the clutch member 17 is keyed, and thus reducing the speed of the rotating mass 28. Provision is also made for control of the angular velocity of the rotating mass 28 independently of the engine 7, as by means of the brake band 39 and brake lining and drum 38 on the body 15, operated manually or by foot pedal. Only a portion of the operating lever 40 is shown in Figure 2.

In the modification illustrated in Figure 3, the body or mass 28 is driven by a motor 34 receiving its current from the generator 33 through the leads 35 and rheostat 36. The generator 33 is driven by the engine 7, as shown, being connected to it by the pinion 11 and ring gear 10. An alternative arrangement is shown in the same Figure 3, wherein current is supplied to the motor 34 from the battery 37. In the latter arrangement, the angular velocity of the rotating mass 28 is independent of the engine speed. Standard switches are provided for cutting off the current supply and for putting one or the other of the two alternative arrangements into operation.

In the modification shown in Figures 4 and 5, the body or mass 28 is driven directly by the engine 7, being coupled to the driving shaft 8 by means of the worm gear 13, shaft 12, pinion 11 and ring gear 10. An over-running clutch 32 is provided in this case to prevent the momentum of the rapidly revolving mass 28 from reacting on the engine shaft 8. The over-running clutch is too well known to need detailed description which, accordingly, is omitted.

The hand or foot brake shown in Figure 2 (38—39—40), although not shown in Figure 4, may, of course, be added in this modification of the invention.

Thus, it will be seen that the rotating mass 28 may be driven (1) directly by the automobile engine, as, for instance, in the case illustrated in Figure 4, 5; (2) indirectly by the automobile engine, as, for instance, in the case illustrated in Figure 2 wherein motive power is supplied by the vacuum of the engine manifold, or, in the case illustrated in Figure 3, wherein motive power is supplied by a generator driven by the automobile engine; or (3) independently of the automobile engine, as, for instance, in the case illustrated in Figure 3, wherein motive power is supplied by a battery. In all cases wherein the motive power is derived from the automobile engine, whether directly or indirectly, the action is unilateral, i. e. the momentum of the rotating mass 28 does not appreciably affect the engine speed.

As to the various methods of controlling the angular velocity of the rapidly rotating body or mass 28, the moment this angular velocity exceeds a predetermined maximum, the arms 21 of the centrifugal governor 19—20—21 exert pressure on the clutch member 17 causing it to engage the body 15 which is connected to the engine shaft 8 through the gear and shaft train 14—13—12—11—10. This will cause the lower speed of the engine shaft to brake the speed of the member 17 and of the shaft 16 to which the member 17 is keyed, until the angular velocity of the rotating mass 28 falls back to its predetermined maximum and the pressure of the arms 21 on the member 17 is released, the spring 18 acting to disengage the clutch member 17.

In the modification illustrated in Figure 3, when the switch to the battery 37 is open and the switch to the generator is closed, the angular velocity of the rotating mass 28 is substantially proportional to the speed of the engine and, therefore, to the speed of the vehicle. When the switch to the generator is open and the switch to the battery is closed, the angular velocity of the rotating mass 28 is independent of the engine speed and is regulated by the rheostat 36. The rheostat 36, of course, may also be used as an additional controlling means in the case when the motor 34 is actuated by the generator 33, just as the hand or foot brake 38—39—40 of Figure 2 may be used for controlling the angular velocity of the rotating mass 28 in the forms of device shown in Figures 2, 4 and 5.

It is well to note that the angular velocity of the rotating mass 28 is well in excess of that of the engine shaft 8. Because the body 28 rotates in a vacuum, which is preferable although not indispensable, it will continue to revolve for a long time after the source of motive power has ceased to operate, which ordinarily does not matter. When desired, it is readily stopped by the application of the brake. Vacuum in the chamber 29 has the advantage of requiring very little power to drive the mass 28.

The present invention is primarily intended for use in automobiles, i. e. in self-propelling vehicles which are either four-wheeled or three-wheeled. In either case, the vehicle has at least one treaded pair of wheels, i. e., a pair of wheels disposed on opposite sides of the vehicle and generally mounted on the same axle.

When an automobile makes a turn at high speed, it is subjected to the action of centrifugal forces. The gyroscopic torque developed by the rapidly rotating body or mass 28 of the present device opposes this action. If we denote by $\alpha$ the angular velocity of the rotating mass, and by $\omega$ the angular velocity of the car along the curved path, then the centrifugal torque is proportional to $\omega^2$, while the gyroscopic torque is proportional to $\alpha\omega$. The two torques need not be equal to preserve the equilibrium of the car, because, as explained below, the elastic connection between the body of the car and the axles of the wheels absorbs a part of the centrifugal torque, but the two torques should be proportional to one another if a uniform effect is desired at all speeds of the vehicle. To secure such a uniform effect, therefore, it is only necessary to make the angular velocity $\alpha$ of the rotating mass 28 proportional to $\omega$, i. e. to the speed of the car, assuming, as is usually the case, that the curves are arcs of a circle. The action is unilateral in all cases, i. e., while the angular velocity of the rotating mass 28 is controlled by the speed of the car, or, as has been shown in at least one illustration above (Fig. 3, battery circuit), is entirely independent of the engine or vehicle speed. The mass 28 exercises no control over the speed of the vehicle.

The first effect of the centrifugal torque is to compress the automobile springs on the side farthest away from the center of the curve. The resistance to compression offered by the springs counteracts to some extent the effect of the centrifugal torque which is thus partly absorbed by the springs. For this reason, the gyroscopic torque need not be as great as it would have to be if there were no springs on the vehicle. Consequently, a comparatively light weight of the rotating mass 28 will meet the essential requirements of stability, but the cooperation of the springs with the rotating body or mass 28 goes further than this. If the gyroscopic torque is sufficiently great, it will cause the springs on the "inner" side of the car, i. e. on the side nearest the center of the curve, to compress, with the result that the body of the car will assume an inclination similar to that of a railroad car on a curved track, or of a monorail car under the action of centrifugal forces, so that the body of the car will be in perfect equilibrium under the action of all the forces operating at the time. Besides, as has already been stated in the preamble, the properly inclined position of the car body is one affording most comfort to the passengers.

While, in the drawings, only the prevailing type of automobile is used for the purpose of illustrating the device, i. e. the type in which the treaded pair of wheels is mounted on the same axle, the device is clearly applicable to other types of automotive vehicles, such, for instance, wherein the wheels of the treaded pair are independently connected to the chassis. In the latter case, the axle 16 of the rotating body 28 is parallel to the line through the centers of the paired wheels. In other cases, for instance, where the vehicle is built on the bicycle principle with a third wheel on the side, the axle 16 of the rotating body 28 is parallel to the axle of the single traction wheel. Of course, at times, the axle 16 of the rotating body 28 may not be exactly parallel to the axle of the road wheels, as when the chassis tilts relatively to the wheels while the car travels on a curve, or when the load distribution on the wheels is uneven. The parallelism is maintained only under normal conditions, travelling along a straight path and with even distribution of load, and it is so assumed in the claims where the term "normally parallel" is used.

Instead of the single rotating body 28, two or more such rotating bodies may be substituted to secure the same gyroscopic torque. This simple and obvious modification may be indicated when the size of the rotating body must be held within certain limits. Furthermore, when two such rotating bodies are used in lieu of a single one, their respective axles need not be parallel to the axle of the treaded pair of wheels, but, while such a disposition of the rotating bodies may be desirable because of some special structural arrangements of other elements of the vehicle, it should be avoided whenever possible because of the reduced efficiency of the device.

Having fully described my invention and illustrated it by several embodiments it is deemed to be unnecessary to add further illustrations either in line with the obvious modifications indicated in the two preceding paragraphs, or in line with such variations, additions or omissions as may suggest themselves to those skilled in the art, and it is to be understood that the examples given are in no sense intended as implying limitations in either construction or operation, but only as concrete means for illustrating the underlying principles.

I claim:

1. An automotive vehicle having at least one treaded pair of road wheels disposed on opposite sides of the vehicle and comprising an engine having a driving shaft, transmission means from said shaft to at least one of said wheels, a body rotatable about an axis other than the axis of said shaft and normally parallel to the axle of said driven wheel, said body axis being fixed relatively to the chassis frame of said vehicle, and unilateral means for causing said body to rotate in a sense opposite that of the rotation of said wheels.

2. An automotive vehicle having at least one treaded pair of road wheels disposed on opposite sides of the vehicle and comprising an engine having a driving shaft, transmission means from said shaft to said wheels, a body rotatable about an axis other than the axis of said shaft and normally parallel to the line through the centers of said wheels, said body axis being fixed relatively to the chassis frame of said vehicle, and unilateral means for causing said body to rotate in a sense opposite that of the rotation of said wheels.

3. An automotive vehicle having at least one treaded pair of road wheels disposed on opposite sides of the vehicle and comprising an engine having a driving shaft, transmission means from said shaft to at least one of said wheels, a body rotatable about an axis fixed relatively to the chassis frame of said vehicle and normally parallel to the axle of said driven wheel, and means for causing said body to rotate about said axis at an angular velocity independent of that of said shaft and in a sense opposite that of the rotation of said wheels.

4. An automotive vehicle having at least one treaded pair of road wheels disposed on opposite sides of the vehicle and comprising an engine having a driving shaft, transmission means from said shaft to said wheels, a body rotatable about an axis fixed relatively to the chassis frame of said vehicle and normally parallel to the line through the centers of said wheels, and unilateral means for causing said body to rotate about said axis at an angular velocity in excess of that of said shaft and in a sense opposite that of the rotation of said wheels.

5. An automotive vehicle having at least one treaded pair of road wheels disposed on opposite sides of the vehicle and comprising an engine having a driving shaft, transmission means from said shaft to said wheels, a body rotatable about an axis fixed relatively to the chassis frame of said vehicle and normally parallel to the line through the centers of said wheels, means for causing said body to rotate about said axis in a sense opposite that of the rotation of said wheels, and means dependent on the speed of said vehicle for braking the rotation of said body.

6. An automotive vehicle having at least one treaded pair of road wheels disposed on opposite sides of the vehicle and comprising an engine having a driving shaft, transmission means from said shaft to at least one of said wheels, a body rotatable about an axis fixed relatively to the chassis frame of said vehicle and normally parallel to the axle of said driven wheel, means for causing said body to rotate in a sense opposite that of the rotation of said wheels, and a unilateral connection between said engine and said rotating body for reducing the angular velocity of said body.

7. An automotive vehicle having at least one treaded pair of road wheels disposed on opposite sides of the vehicle and comprising an engine having a driving shaft, transmission means from said shaft to at least one of said wheels, a body rotatable about an axis fixed relatively to the chassis frame of said vehicle and normally parallel to the axle of said driven wheel, and unilateral means for causing said body to rotate about said axis at an angular velocity proportional to the speed of said vehicle and in a sense opposite that of the rotation of said wheels.

8. An automotive vehicle having at least one treaded pair of road wheels disposed on opposite sides of the vehicle and comprising an engine having a driving shaft, transmission means from said shaft to at least one of said wheels, a body rotatable about an axis fixed relatively to the chassis frame of said vehicle and normally parallel to the axle of said driven wheel, and unilateral means for causing said engine to rotate said body about said axis in a sense opposite that of the rotation of said wheels.

9. An automotive vehicle having at least one treaded pair of road wheels disposed on opposite sides of the vehicle and comprising an engine having a driving shaft, transmission means from said shaft to at least one of said wheels, a body rotatable about an axis fixed relatively to the chassis frame of said vehicle and normally parallel to the axle of said driven wheel, and means unilaterally controlled by said engine for causing said body to rotate at an angular velocity proportional to the speed of said vehicle and in a sense opposite that of the rotation of said wheels.

10. An automotive vehicle having at least one treaded pair of road wheels disposed on opposite sides of the vehicle and comprising an engine having a driving shaft, transmission means from said shaft to at least one of said wheels, a body rotatable about an axis fixed relatively to the chassis frame of said vehicle and normally parallel to the axle of said driven wheel, and means independent of said shaft for causing said body to rotate about said axis in a sense opposite that of the rotation of said wheels.

11. An automotive vehicle having at least one treaded pair of road wheels disposed on opposite sides of the vehicle and comprising an engine having a driving shaft, transmission means from said shaft to said wheels, an elastic connection between the chassis frame of said vehicle and said wheels, a body rotatable about an axis other than the axis of said shaft and fixed relatively to said chassis frame, cooperating with said elastic means to maintain the equilibrium of said vehicle when it makes a turn, and unilateral means for rotating said rotatable body.

12. An automotive vehicle having at least one treaded pair of road wheels disposed on opposite sides of the vehicle and comprising an engine having a driving shaft disposed longitudinally of the vehicle, transmission means from said shaft to at least one of said wheels, a body rotatable about a horizontal axis fixed relatively to the chassis frame of said vehicle and perpendicular to said shaft, and unilateral means for causing said body to rotate about said axis in a sense opposite that of the rotation of said wheels.

PETER NICOLAS PETERS.